United States Patent
Keefe et al.

(10) Patent No.: US 11,103,786 B2
(45) Date of Patent: Aug. 31, 2021

(54) AUGMENTED REALITY TOY

(71) Applicant: Swapbots Ltd, Liverpool (GB)

(72) Inventors: John Alexander Keefe, Merseyside (GB); Andrew Joseph Cooper, Merseyside (GB)

(73) Assignee: Swapbots Ltd

( * ) Notice: Subject to any disclaimer, the term of this patent is extended or adjusted under 35 U.S.C. 154(b) by 168 days.

(21) Appl. No.: 16/304,990

(22) PCT Filed: May 24, 2017

(86) PCT No.: PCT/GB2017/000083
§ 371 (c)(1),
(2) Date: Nov. 27, 2018

(87) PCT Pub. No.: WO2017/203194
PCT Pub. Date: Nov. 30, 2017

(65) Prior Publication Data
US 2020/0330873 A1    Oct. 22, 2020

(30) Foreign Application Priority Data
May 27, 2016   (GB) .................................... 1609443

(51) Int. Cl.
*G06T 19/00*        (2011.01)
*A63F 13/65*        (2014.01)
(Continued)

(52) U.S. Cl.
CPC ............ *A63F 13/65* (2014.09); *A63F 13/213* (2014.09); *A63F 13/843* (2014.09);
(Continued)

(58) Field of Classification Search
None
See application file for complete search history.

(56) References Cited

U.S. PATENT DOCUMENTS 9,827,507 B2    11/2017   Muthyala et al.
10,549,209 B2    2/2020   Muthyala et al.
(Continued)

FOREIGN PATENT DOCUMENTS

BR    112013029916 A2    1/2017
CA        2836360 A1    11/2012
(Continued)

OTHER PUBLICATIONS

"LEGO Platforner game—Mobile Augmented Reality (AR)," Web page <https://www.youtube.com/watch?y=1-7HnOmPyl>, 1 page, Jan. 14, 2011, retrieved from Internet Archive Wayback Machine <https://web.archive.org/web/20110127141703/https://www.youtube.com/watch?v=1-7HnOmPYjl[04/04/2018 12:39:19]> on Apr. 4, 2018.
(Continued)

*Primary Examiner* — Tize Ma
(74) *Attorney, Agent, or Firm* — Fishman Stewart PLLC

(57) ABSTRACT

A toy, for use with a viewing device, may include a plurality of component parts at least two of which include at least one augmented reality marker of a plurality of augmented reality markers enabling digital content associated with the at least one augmented reality marker to be unlocked and influencing at least one of an appearance and function of the toy on the viewing device. The plurality of augmented reality markers, each of which may be a physically independent augmented reality image marker, may be combined and converted into a composite augmented reality marker to produce a single, unique physical item and a composite digital representation.

20 Claims, 20 Drawing Sheets

(51) Int. Cl.
  *A63F 13/213* (2014.01)
  *A63F 13/843* (2014.01)
  *G06K 9/00* (2006.01)
  *H04W 4/80* (2018.01)

(52) U.S. Cl.
  CPC .......... *G06K 9/00671* (2013.01); *H04W 4/80* (2018.02); *A63F 2300/8082* (2013.01)

(56) References Cited

U.S. PATENT DOCUMENTS

| | | | |
|---|---|---|---|
| 2002/0127944 | A1 | 9/2002 | Spector |
| 2010/0214284 | A1* | 8/2010 | Rieffel .................. G06T 17/00 345/419 |
| 2012/0122570 | A1 | 5/2012 | Baronoff |
| 2013/0249944 | A1* | 9/2013 | Raghoebardayal ..... G06F 3/011 345/633 |
| 2014/0151960 | A1 | 6/2014 | Caffrey |
| 2014/0378023 | A1 | 12/2014 | Muthyala et al. |
| 2015/0080125 | A1* | 3/2015 | Andre .................... A63H 3/50 463/31 |
| 2015/0234189 | A1* | 8/2015 | Lyons .................... A63F 13/26 345/174 |
| 2016/0078683 | A1* | 3/2016 | Sudol .................... G06T 19/006 345/633 |
| 2016/0151705 | A1* | 6/2016 | Ji ....................... H04N 21/4223 463/29 |
| 2020/0147507 | A1 | 5/2020 | Muthyala et al. |

FOREIGN PATENT DOCUMENTS

| | | |
|---|---|---|
| CN | 103998107 A | 8/2014 |
| DK | 2714222 T3 | 6/2016 |
| DK | 3042704 T3 | 6/2019 |
| EP | 2714222 A1 | 4/2014 |
| EP | 2862604 A1 | 4/2015 |
| EP | 3042704 A1 | 7/2016 |
| EP | 2202608 B1 | 8/2016 |
| EP | 3511062 A1 | 7/2019 |
| ES | 2570852 T3 | 5/2016 |
| HK | 1196327 A1 | 12/2014 |
| JP | 2014515961 A | 7/2014 |
| KR | 20140043904 A | 4/2014 |
| MX | 2013013545 A | 12/2014 |
| PL | 2714222 T3 | 7/2016 |
| WO | 2011/017393 A1 | 2/2011 |
| WO | 2012/160055 A1 | 11/2012 |
| WO | 2016075081 A1 | 5/2016 |

OTHER PUBLICATIONS

LEGO Platformer game—Mobile Augmented Reality (AR), SkawaLtd, Web page, 1 page <https://www.youtube.com/watch?v=1-7HnOmPYj]>, 1 page, Jan. 27, 2011, retrieved from Internet Archive Wayback Machine <https://web.archive.org/web/20110127141703/https://www.youtube.com/watch?v=1-7HnOmPYjl[04/04/2018 12:39:19]> on Apr. 4, 2018.

LEGO Platformer game—Mobile Augmented Reality (AR), SkawaLtd Web page, <https://www.youtube.com/watch?v=1-7HnOmPYj]>, 1 page, Mar. 22, 2011, retrieved from Internet Archive Wayback Machine < https://web.archive.org/web/20110322143028/https://www.youtube.com/watch?v=1-7HnOmPYjl[04/04/2018 12:44:09]> on Apr. 4, 2018.

"LEGO Bricks: "LEGO Signs" Direct marketing by Plan.net, Serviceplan Munich," Web page, <https://www.coloribus.com/adsarchive/directmarketing/lego-bricks-lego-signs-15413855/[04/04/2018 10:08:35]>, 3 pages, retrieved from Internet Archive Wayback Machine <https://web.archive.org/web/*/https://www.coloribus.com/adsarchive/directmarketing/lego-bricks-lego-signs-15413855/> on Apr. 4, 2018.

"LEGO Bricks: LEGO Signs" Direct marketing by Plan.net, Serviceplan Munich, Web page, <https://www.youtube.com/watch?v=1-7HnOmPYj]>, 1 page, Oct. 17, 2015, retrieved from Internet Archive Wayback Machine <https://web.archive.org/web/20151017072143/https://www.coloribus.com/adsarchive/directmarketing/lego-bricks-lego-signs-15413855/> on Apr. 4, 2018.

"Weekly Linkfest | Games Alfresco," Web page, <https://gamesalfresco.com/2011/01/23/weekly-linkfest-72/[04/04/2018 09:21:51]>, 2 pages, Jan. 23, 2011, retrieved from Internet Archive Wayback Machine <http://web.archive.org/web/20090818144217/ http://www.farmshopstore.com/handtools.html> on Dec. 20, 2012.

"Games Alfresco," Web page, <https://gamesalfresco.com/2011/01/23/weekly-linkfest-72>, 3 pages, Jan. 23, 2011, retrieved from Internet Archive Wayback Machine < https://web.archive.org/web/20110315030131/https://gamesalfresco.com/2011/01/23/weekly-linkfest-72/> on Apr. 4, 2018.

"legoplatformer.com/showcase," Web page, <legoplatformer.com/showcase>, 3 pages, Jan. 27, 2011, retrieved from Internet Archive Wayback Machine <https://web.archive.org/web/20110127181743/legoplatformer.com/showcase> on Apr. 4, 2018.

"Augmented Reality Gaming—All your Smartphone are Belong to us?—Gamespiel," Web page, <http://gamespiel. typepad.com/my-blog/2011/04/augmented-reality-gaming-all-your-smartphone-are-belong-to-us.html[04/04/2018 09:56:18]>, 3 pages., Apr. 23, 2011, retrieved from Internet Archive Wayback Machine <https://web.archive.org/web/20110101000000*/ http://gamespiel.typepad.com/my-blog/2011/04/augmented-reality-gaming-all-your-smartphone-are-belong-to-us.html> on Apr. 4, 2018.

"Augmented Reality Gaming—All your Smartphone are Belong to us?—Gamespiel," Web page, <http://gamespiel. typepad.com/my-blog/2011/04/augmented-reality-gaming-all-your-smartphone-are-belong-to-us.html[04/04/2018 09:56:18]>, 3 pages, May 28, 2011, retrieved from Internet Archive Wayback Machine <https://web.archive.org/web/20110615000000*/http://gamespiel.typepad.com/my-blog/2011/04/augmented-reality-gaming-all-your-smartphone-are-belong-to-us.html> on Apr. 4, 2018.

"legoplatformer.com—Domain name info," Web page, 6 pages, <http://www.statsinfinity.com/domain/w1WH6Anlbbn_b67BaPM0Qf0Hv6qPnX8T_info.html[04/04/2018 10:04:50], retrieved Apr. 4, 2018.

<http://awards.serviceplan-hamburg.de/Lego_Signs_EN/]>, 2 pages, Mar. 11, 2011, retrieved from Internet Archive Wayback Machine <https://web.archive.org/web/20110314012646/http:/wards.serviceplan-hamburg.de/Lego_Signs_EN> on Apr. 4, 2018.

"BERG Suwappu: Toys in media," Web page, <http://berglondon.com/blog/tag/augmented-reality/[04/04/2018 12:14:19]>, 3 pages, Apr. 5, 2011, retrieved from Internet Archive Wayback Machine <https://web.archive.org/web/20110423084413/http:/berglondon.com/blog/tag/augmented-reality/[04/04/2018 12:21:08]> on Apr. 4, 2018.

"BERG Suwappu: Toys in media," Web page, <http://berglondon.com/blog/tag/augmented-reality/[04/04/2018 12:14:19]>, 3 pages, Apr. 23, 2011, retrieved from Internet Archive Wayback Machine <https://web.archive.org/web/2011423084413/http:/berglondon.com/blog/tag/augmented-reality/[Apr. 4, 2018 12:21:08]> on Apr. 4, 2018.

"Suwappu|Suwappu is a range of characters and an augmented . . . ", web page, https://www.flickr.com/photos/dentsulondon/5590613412/in/photostream[13/04/2018 10:14:12], 2 pages, Apr. 5, 2011, retrieved Apr. 13, 2018.

"Suwappu! Flickr"<http://www.dentsulondon.com/blog/2011/04/05/introducing-suwappu/>, Web page, 1 page, Apr. 5, 2011, retrieved from https://www.flickr.com/photos/dentsulondon/sets/72157626384009021[04/04/2018 12:27:56], Apr. 4, 2018.

* cited by examiner

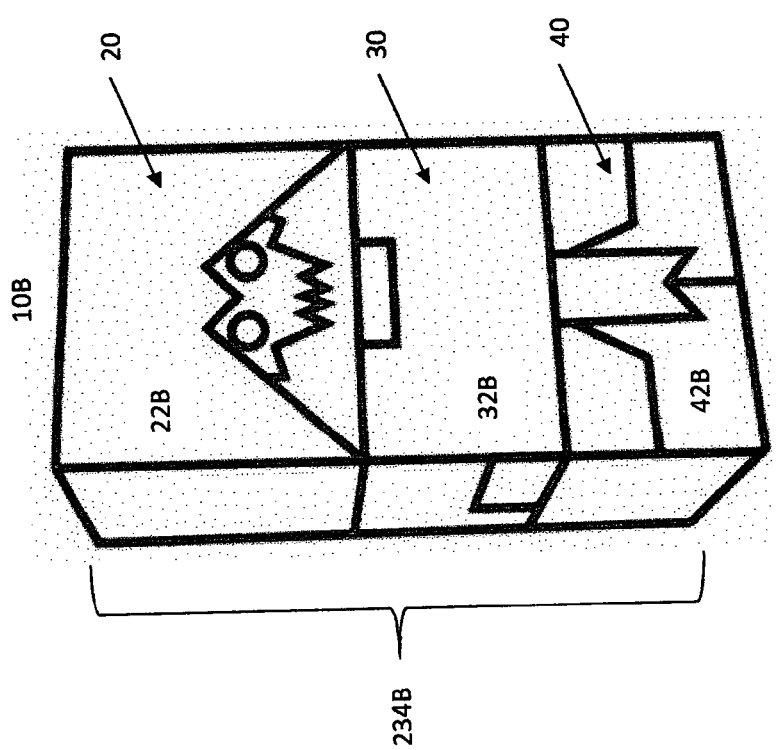

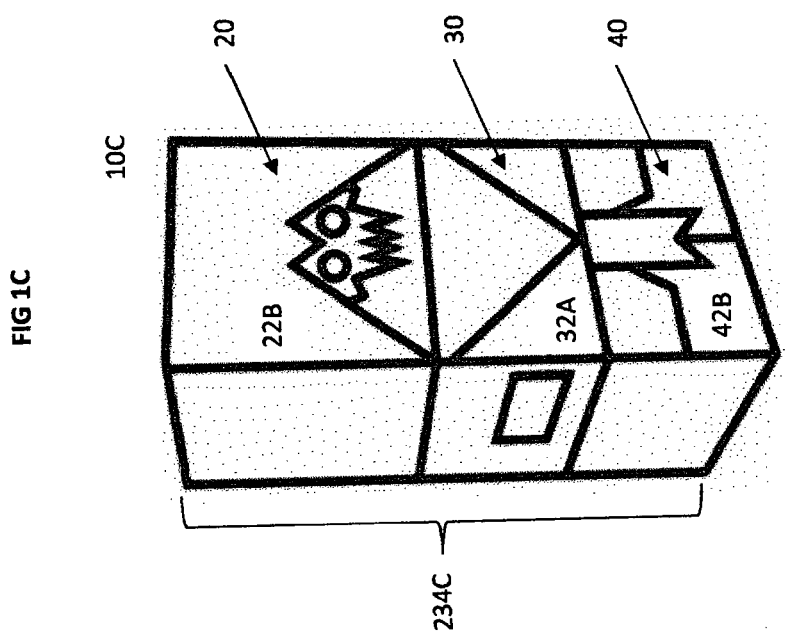

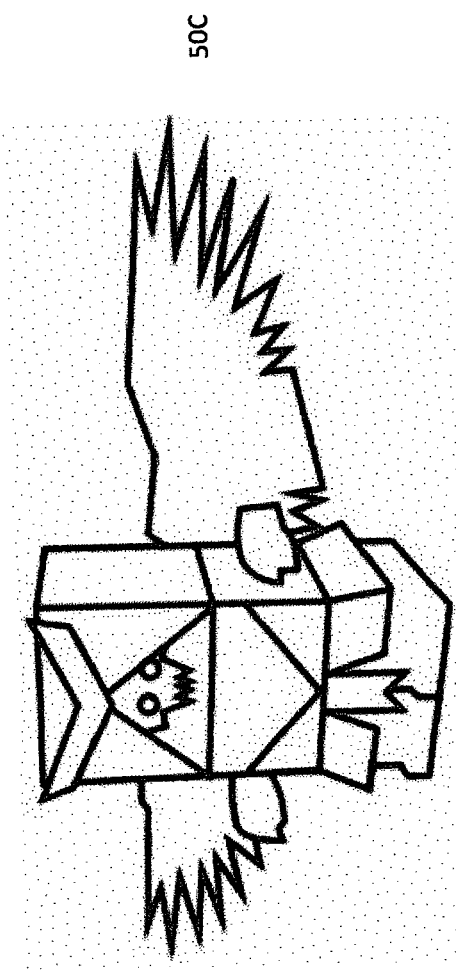

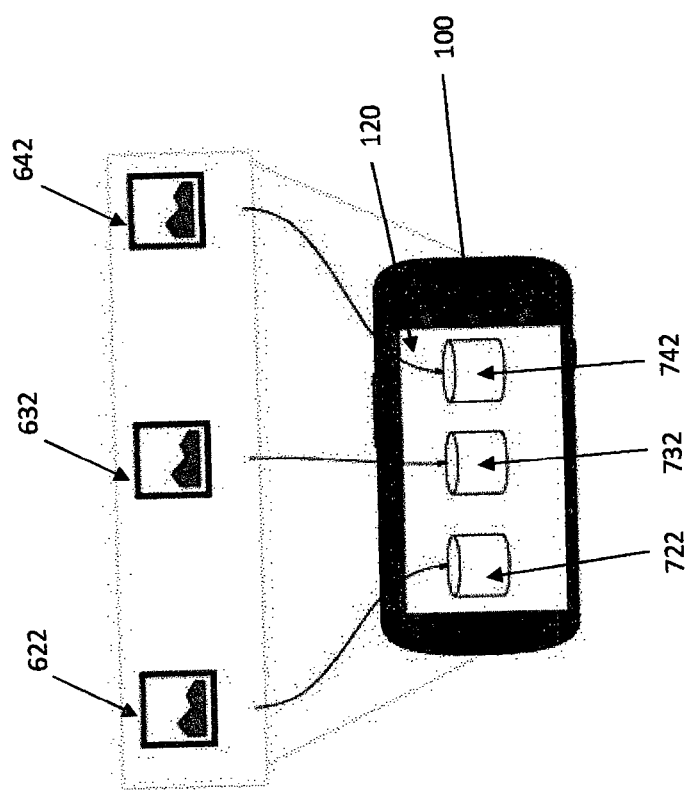

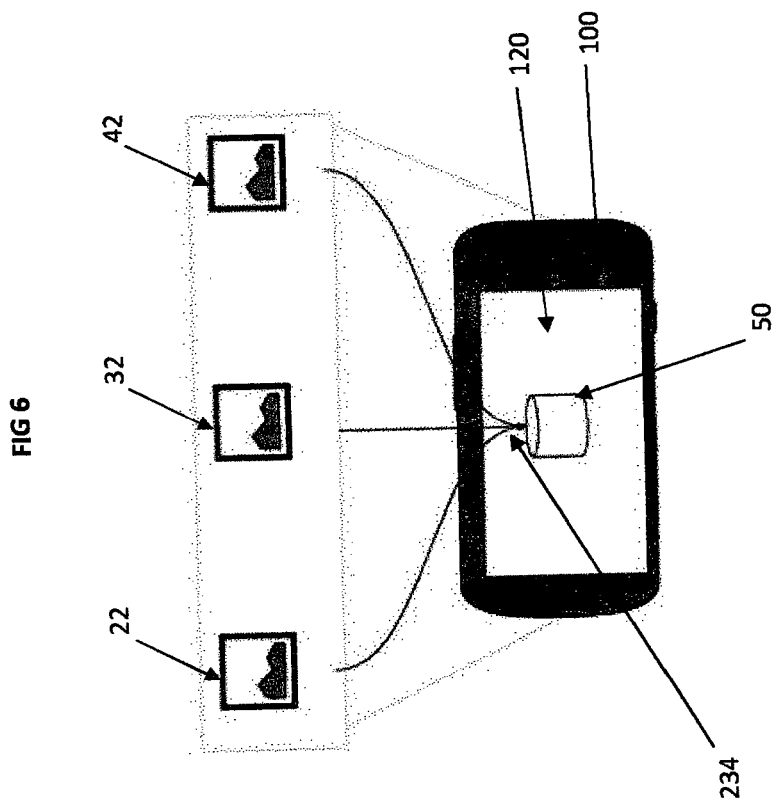

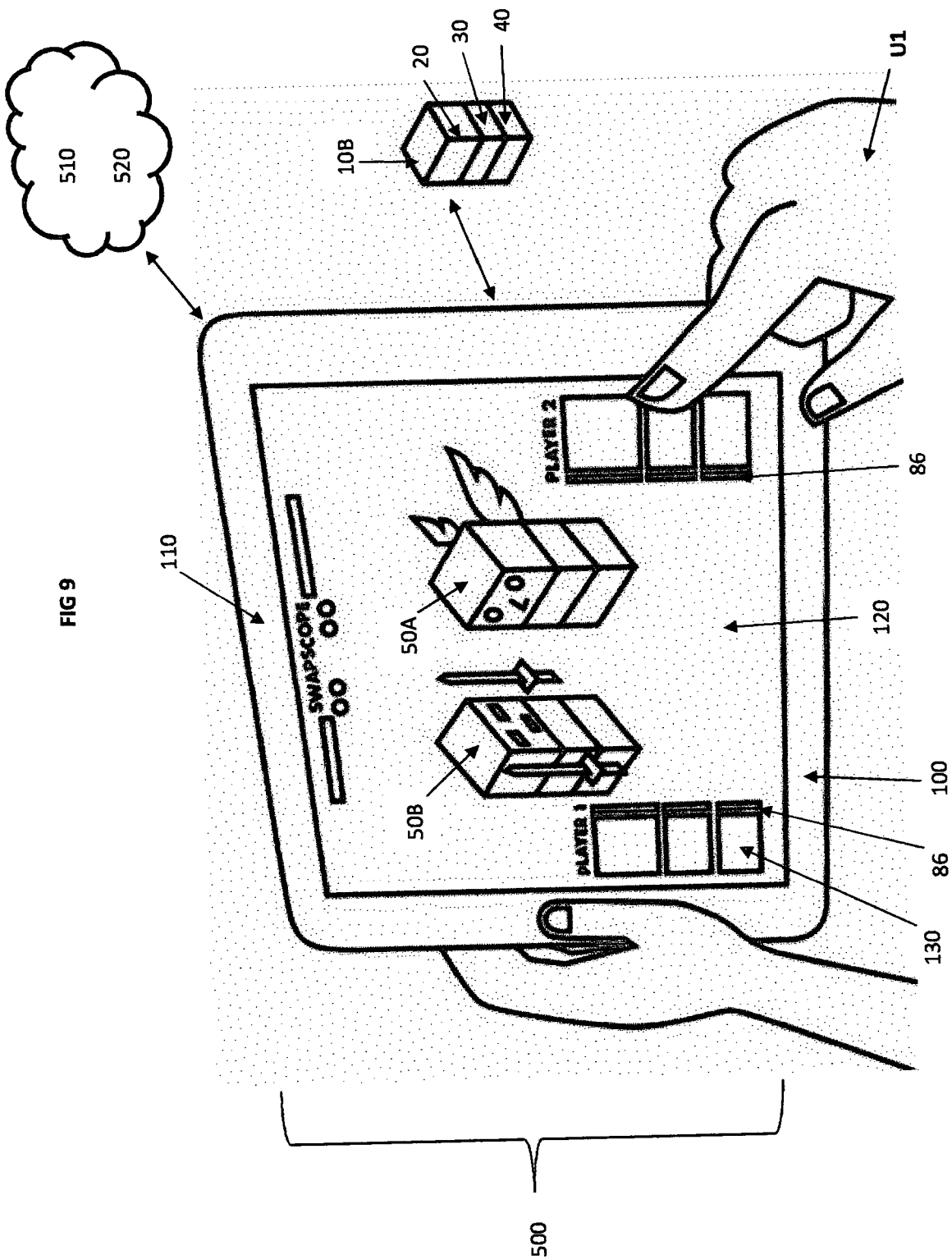

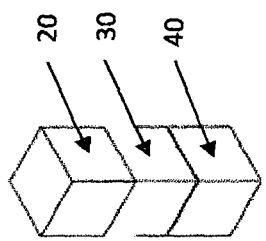
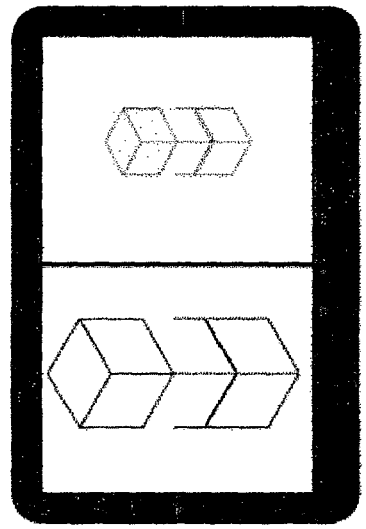
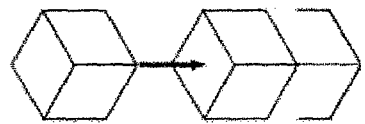
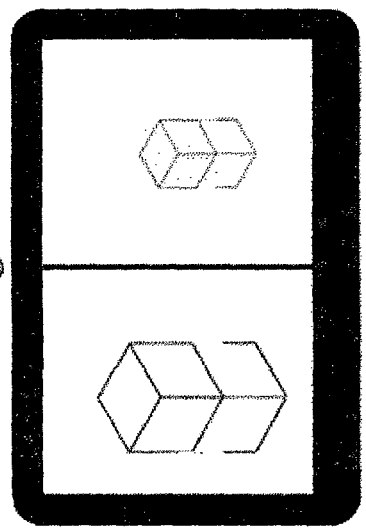
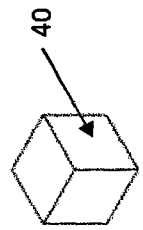
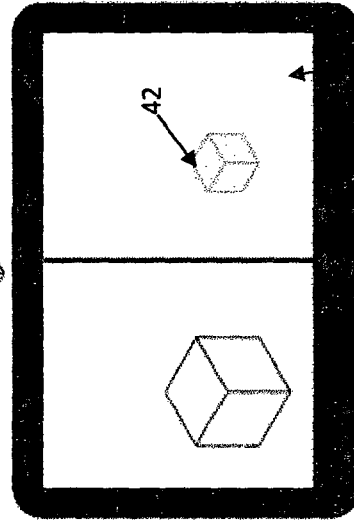
FIGS 10A – 10C
FIG 10C
FIG 10B
FIG 10A FIG 13C
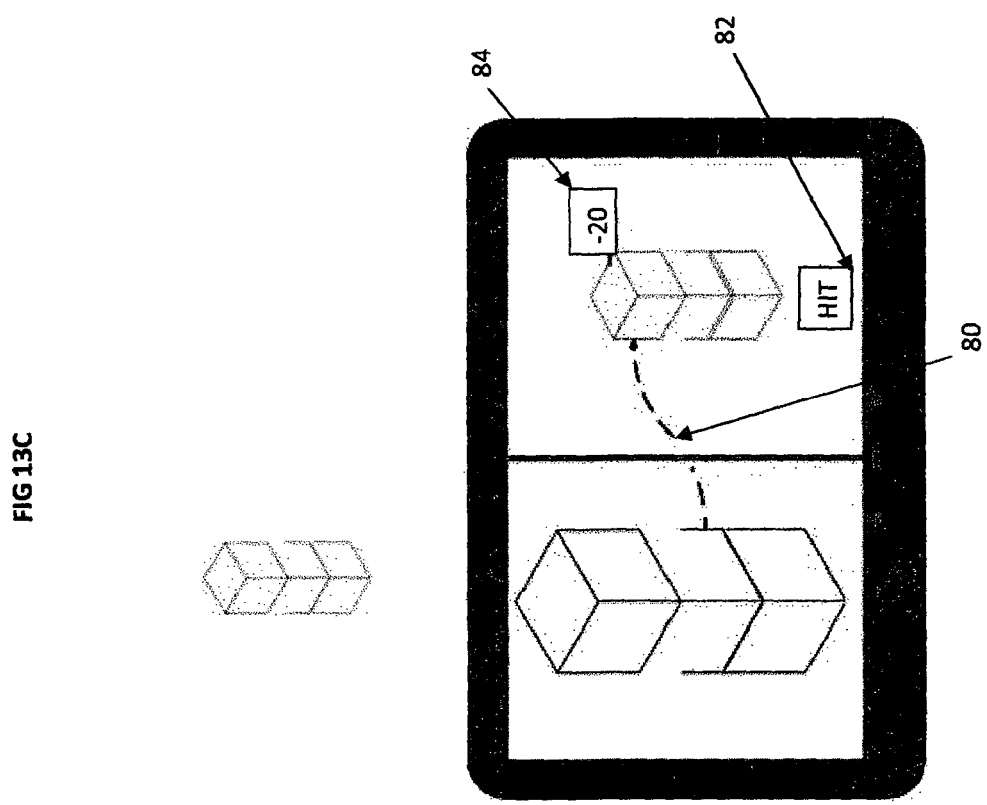

AUGMENTED REALITY TOY

CROSS REFERENCE TO RELATED APPLICATIONS

This application claims priority to International Application No. PCT/GB2017/000083 filed on May 24, 2017, and Great Britain Application No. GB 1609443.5 filed on May 27, 2016, the contents of each of which are hereby incorporated by reference in their entirety.

TECHNICAL FIELD

The present invention relates to a toy, a digital game and a system enabling a physical toy to be brought to life when viewed through a viewing device such as a smartphone or tablet. Preferably, the toy is used in conjunction with an additional element e.g. a playing surface, which serves as, and can be tracked as, a separate marker to the toy. By placing the toy on the playing surface the toy can be moved around e.g. an augmented environment.

BACKGROUND

Toys, or rather figurine characters such as Skylanders®, have been used with games consoles to influence the game content. However, their use is relatively expensive as they contain near field communication devices (NFC's) and base stations to communicate with the console. Furthermore, the toy itself does not form part of the gaming experience and merely sits on a base station whilst a player watches a screen and plays the game via a console.

US 2014/0267404 describe techniques for displaying an augmented reality toy. The specification gives an example where the toy is a castle, and when viewed through a device, rendered content is associated with the castle.

However the methodology does no more than associate digital content with a part of the toy, for example windows.

US2014/0378023 describes toys comprising blocks comprising augmented reality markers. The toys can be tracked in 3D space and virtual graphics and effects can be superimposed to provide the physical toy with virtual attributes.

The specification refers to "composite marker construction elements" whereby a number of construction elements are connected, each of which has a unique AR marker. When presented to a camera of an AR system each component is detected (as illustrated in FIG. 5 of this specification) and digital content overlaid to produce a unique composite. This requires significant computer power as each marker, and its relative position will need to be identified, and information relating to each relayed and interpreted.

The detection of e.g. three markers for head, torso and legs determine the corresponding combined AR marker, and modify the displayed image responsive to the detected combined marker.

US2012/0122570 shows how a figurine may be customised by including a series of markers to assist an augmented reality engine identify a figure and provide augmentation.

The inventors sought to find ways of bridging the gap between physical and digital play in a cost effective manner. The toys come to life by using augmented reality, as opposed to near field capture, and can exploit existing mobile and tablet devices without the need for additional proprietary hardware using, for example, touch controls based on user interface contextual to a component of the toy.

By applying separate markers to a toy and a playing surface, which may be represented in the form of, e.g. a playing card, the toy can be moved about relative to the augmented environment and the toy can interact with the digital content associated with the environment. For example, a toy can kick a digital ball, and cause it to move, since the digital ball is not anchored to the toy.

Using separate markers also makes it possible to track markers in different planes. For example, the toy may be tracked in a vertical plane and the playing surface in a horizontal plane.

Furthermore the use of multiple playing surfaces for multiple toys enables a single device can track and allow interactions between multiple toys, The use of a second playing surface also means there is an independent anchor point for a virtual opponent's toy to be represented.

One of the challenges the inventors faced in adding augmented content to a toy that is actually played with was that children played with the toys in places where the natural light was poor or artificial lighting compromised marker recognition. This was because augmented reality relies heavily on the capability of a device's camera and the lighting conditions in which the user engages with the software. Poor ambient lighting or restrictive hardware capabilities results in poor marker recognition. Although the user may make efforts to improve lighting conditions this may introduce other problems such as reflection or glare.

One way the inventors overcame this problem was to light the toy from inside to enhance marker recognition.

Another technical problem that they had to be overcome was one of authenticating a given toy arrangement from many similar toy arrangements. This was because the toys comprise multiple components in which component parts would be swapped between toys of the same genre to change the toys appearance and its characteristics when viewed or played with through a device such as a tablet or phone.

For example, five toys comprising three components provide for 5×5×5=125 different playing variations. Increasing the number of components to four increases the possible number of variants to 5×5×5×5=625. Similarly increasing the number of toys from 5 to 25 results in 15,625 possible three component variants!

The inventors overcame this problem by using augmented reality image markers on the components that combine to produce a single, unique physical item and composite digital representation.

This is illustrated in FIGS. 6 to 8 of the specification. Thus, to authenticate a given toy the system interrogates at least two (and for a toy comprising three component parts, three) physically independent augmented reality image markers on at least two (three) component parts to determine the relative physical position and/or orientation of each image to ensure they form an authenticated composite digital representation.

This process requires less processing power than the methodology illustrated in FIG. 5, and simplifies and speeds game play.

Indeed, because the toys are intended to be used in multi-player games played through a mobile device with a camera, such as a smart phone or tablet, authenticating a given toy and registering it to a user is required for gaming to take place between different players.

Additional layers of complexity/experiences can be achieved through the use of different playing surfaces, with independent AR marker(s), most preferably in the form of playing cards on which a toy can be placed, and physical items, with independent AR markers, which can be connected to either the toy or the playing surface.

SUMMARY

In accordance with a first aspect of the present invention there is provided a toy, for use with a viewing device, comprising a plurality of component parts at least two of which comprise at least one augmented reality marker enabling digital content associated with said marker to be unlocked and influence how the toy appears and/or functions on said device, wherein the plurality of the augmented reality markers, each of which is a physically independent augmented reality image marker, are combined and converted into a composite augmented reality marker to produce a single, unique physical item and composite digital representation.

The physical toy may be modified by swapping one or more of its component parts with one augmented reality marker for one with a different augmented reality marker and in doing so the toy becomes a different character and unlocks different digital content. The new combination of markers giving rise to a new unique composite marker.

Preferably the toy comprises at least two, and more preferably at least three, component parts that are interchangeable.

More preferably at least two of said component parts comprise a male and/or female mating member or other connection means allowing said component parts to be easily linked to one another, and the component parts to be easily switched between toys of the same genre so as to create a toy variant and also change the appearance and/or function of said toy when viewed through a device.

Unlike other toys used with games consoles, the toys of the present invention do not comprise a near field capture (NFC) device.

Preferred toys take the form of characters with a head, torso and lower body.

These toys may receive ancillary components which also comprise markers and can thus affect game play. Such ancillary components include, but are not limited to, a weapon, a transport means, and/or a protective device.

The preferred toys of the invention are of a simple construction comprising a plurality of component parts that are preferably multi-faceted.

In one embodiment they comprise a plurality of blocks or block like elements

Preferably each block comprises an augmented reality marker on at least one face.

In accordance with a second aspect of the invention there is provided a toy comprising an augmented reality marker wherein the toy further comprises a light means for lighting the augmented reality marker.

Preferably the toy is hollow and comprises a light inside the toy which lights the augmented reality marker from behind the marker as it is viewed.

Preferably a toy of any aspect of the invention is packaged with instructions on how to access augmented digital content and/or play a game.

According to a third aspect of the invention there is provided a kit of parts comprising a toy of one or more aspects of the invention together with one or more of a book, a playing surface, accessories, and gaming instructions.

The playing surface preferably takes the form of a playing card, which can be tracked as a separate independent marker within an augmented experience.

Creating an augmented environment that can be tracked independently of the toy has benefits, since if the toy acts as the anchor point the digital content moves with it. Separately tracking the toy and the augmented environment facilitates greater functionality and a richer playing experience. For example, a toy can move independently of the digital content of the environment.

According to a forth aspect of the invention there is provided a system enabling a toy according to any of the aspects of the invention or a kit of parts of the invention to be played with whilst viewing it through a device that can access augmented digital content.

Indeed, playing with the physical toy (e.g. turning it to one side) during game play might be used to affect gameplay outcome.

The system further comprises one or more of software, a processor, storage, memory, an operating system, an i/o device, an accelerometer and a network interface.

The system enables the toy to be interrogated such that it can determine the presence of at least two physically independent augmented reality image markers on at least two component parts and further confirm that the component parts are in a correct relative physical position and/or orientation such that the respective image markers form an authenticated composite digital representation.

Preferably the system continuously evaluates a devices' camera feed in order to determine the relative physical position and/or orientation of each image marker to ensure they form an authenticated composite digital representation.

In a preferred embodiment the system facilitates the playing of a game between at least two players each viewing a toy, or a player and his toy against one selected by the system.

Preferably the game is played on a playing surface, such as a playing card, which can be tracked independently of the toy. Preferably the game apparatus comprises a playing surface for each toy, real or virtual.

BRIEF DESCRIPTION OF THE DRAWINGS

Embodiments of the invention are further described hereinafter with reference to the accompanying drawings, in which:

FIGS. 1a to 1c show assembled toys according to a first aspect of the present invention;

FIG. 1a shows a first character; FIG. 1b shows a second character, and FIG. 1c shows a third character which is a chimer of the first and second characters;

FIGS. 2a to 2c show augmented versions of the characters of FIGS. 1a) to 1c);

FIG. 4a shows a scaffold housing one or more lights and a battery (not shown) onto which the components are assembled;

FIG. 4b shows the components assembled on the scaffold of FIG. 4a;

FIG. 5 illustrates the identification of multiple image markers on a toy, as the prior art;

FIG. 6 illustrates the process by which a composite marker is formed from multiple image markers, according to a first aspect of the present invention;

FIG. 9 is a schematic of a system in use such that a first user can view his toy through a device and play a game against a second user with a different toy of the same genre whereby he views both his and his opponents toys in an augmented manner;

FIGS. 10 to 14 illustrate the sequential steps of an illustrative game play using a toy according to the invention in which;

FIGS. 10a to 10c illustrate the steps in detecting a correctly assembled toy;

FIG. 11 illustrates the process steps in registering the toy for game play;

FIG. 12 illustrates the steps for joining a game;

FIGS. 13a to 13c illustrate gameplay in which

FIG. 13a illustrates how a first user gets his toy to attack a second user toy;

FIG. 13b illustrates how the system evaluates the effectiveness of an attack;

FIG. 13c shows the effect of the attack on the opponents toy;

FIG. 14 is a view of a device display of an augmented toy during an attack.

DETAILED DESCRIPTION

The embodiments described are not intended to be limiting, but are rather intended to demonstrate how the various inventions give rise to a new approach to toys and game play.

Figure 1A:
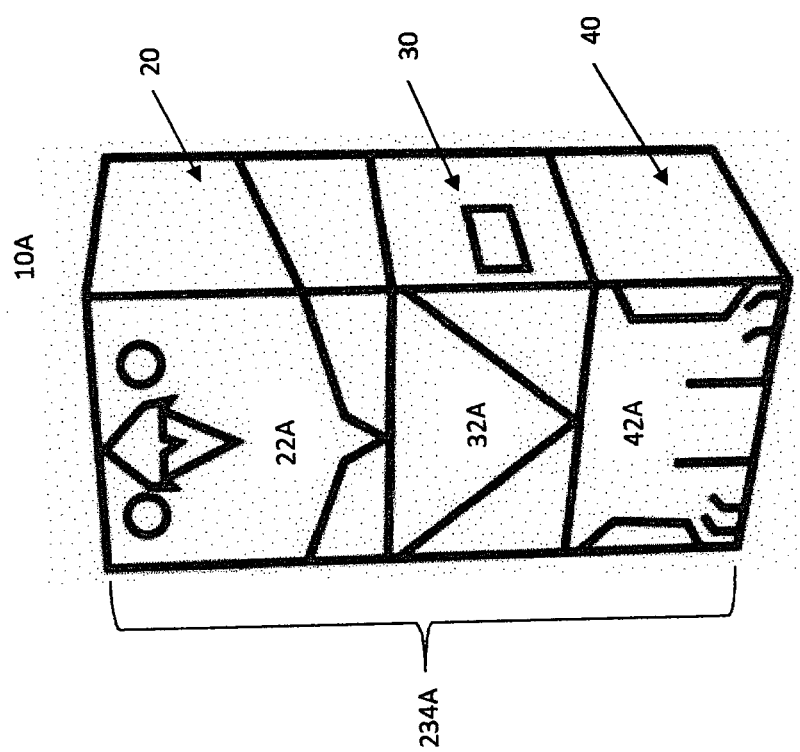

FIGS. 1a, 1b and 1c, illustrate physical toys (10) according to a first aspect of the present invention. FIG. 1a illustrates a first character (10a), FIG. 1b illustrates a second character (10b), and FIG. 1c illustrates a third chimeric character (10c) formed by combining the components (20, 30, and 40) from both the first and second characters.

Each toy (10a, 10b and 10c) comprises a plurality, in this example three, of interconnecting blocks (20, 30 and 40) which form respectively a head (20), a torso (30) and a lower body (40) in the characters illustrated.

The block of each toy is or comprises at least one unique augmented reality marker (22; 32; 42). This preferably takes the form of a unique image (2 dimensional) but it could be based on a unique shape (3 dimensional).

Preferably the marker (22a-b, 32a-b; 42a-b) for each component (20, 30, 40) of each toy (10a, 10b, 10c) wraps around each visible face of a given component (as viewed when correctly assembled).

Figure 3:
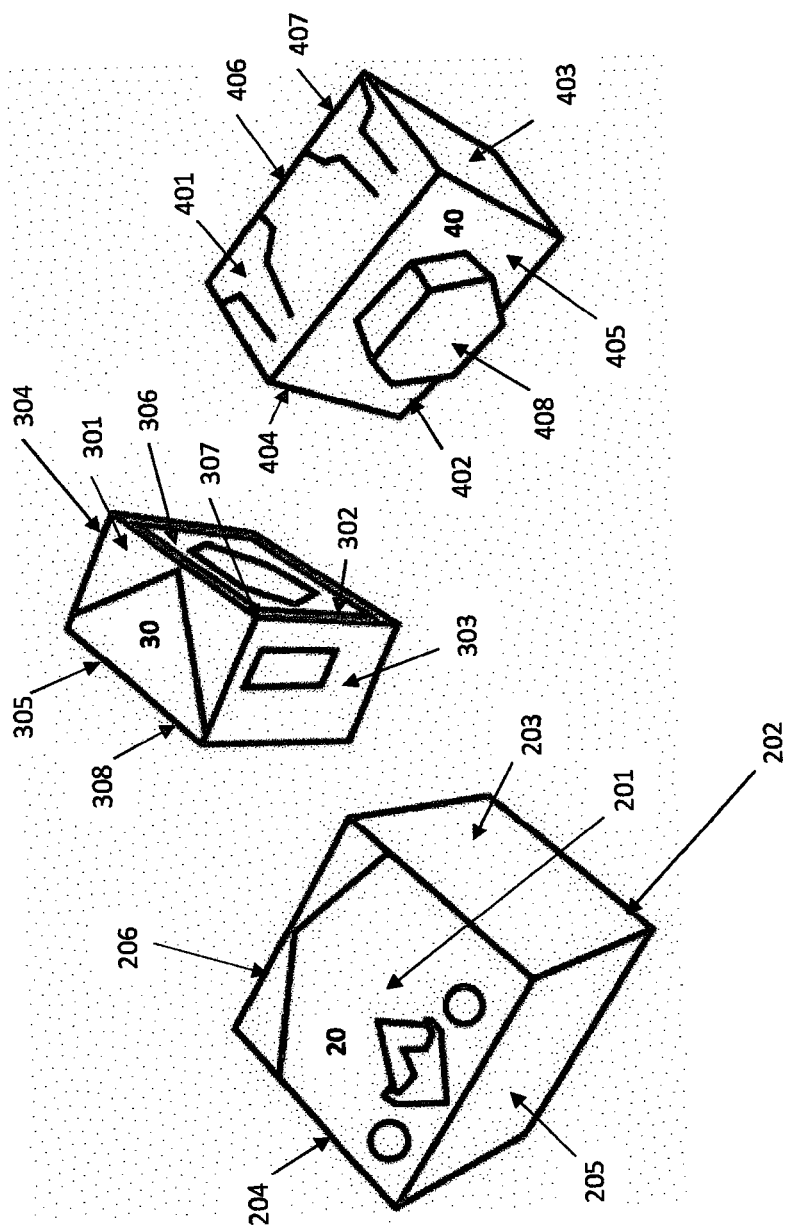
FIG. 3 shows the components of one embodiment of a simple toy, as illustrated in FIG. 1a, before assembly.

Thus, as illustrated in FIG. 3, for the head (20) this includes: the front face (201) corresponding to the face of the character, the rear face (202), the two side face (203 and 204) and the top face (205). For the torso (30) this includes: a front face (301), a rear face (302), and two side faces (303 and 304); and for the lower body (40) this includes: a front face (401), a rear face (402), and two side faces (403 and 404).

By ensuring each marker wraps around its component the assembled component can be authenticated when viewed through an augmented reality device (100) with a camera (110) such as a tablet or mobile phone from any angle.

Alternatively the marker could be limited to the primary viewing face, which for a character is the front face (201, 301, 401), i.e. the face depicting the character.

For the toy (10) to come to life (FIG. 9) it must be viewed through an augmented reality device (100) comprising a camera (110) in a system (500) including software (510). The software identifies that the components (20, 30, 40) are correctly assembled to form an authenticated toy, i.e. one in which the components are connected to one another in the appropriate position (head-torso-lower body) as opposed to an inappropriate position (head-lower body-torso) and in a correct orientation i.e. the torso or lower body are not assembled upside down. Correct orientation also means that all the component faces are in alignment, i.e. all the front faces (201, 301, 401) are aligned in the same plane (and not, for example, a displaced plane (201, 302, 401). The software may be loaded onto the device or it may be accessed through the device communicating with, for example, a server (520).

The software (510) (or a computer readable memory containing a program that, when executed performs an operation for displaying the toy) performs a number of functions and facilitate a number of method steps to ensure an interactive experience.

Thus, the software (510) is responsible for ensuring the toy is authenticated as a toy with a given identity (10a, 10b, 10c) whereby it can overlay digital content (50a, 50b 50c), associated with the authenticated toy, over the camera feed.

Once authenticated the software creates a composite marker (234a, 234b, 234c) from the plurality of component markers (22, 32, 42), and digital content (50a, 50b, 50c) associated with the authenticated toy is unlocked and influences how the toy appears and or functions. Digital content can include visual and audio content.

Figure 2A:
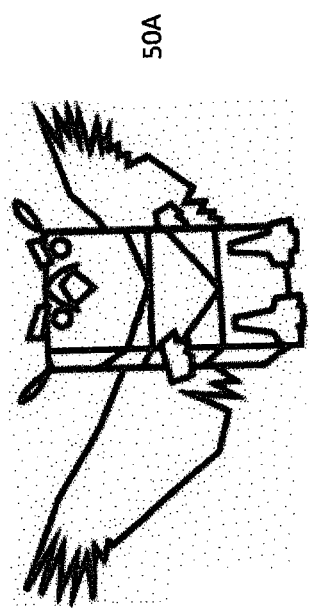
Figure 2B:
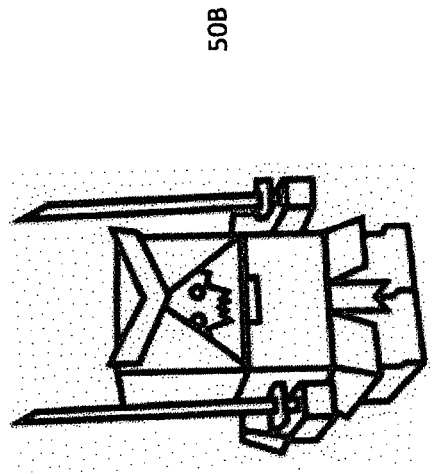

FIGS. 2a, 2b and 2c show the toys of FIG. 1a-1c in augmented form with digital content (50a; 50b and 50c) respectively.

For example, the first character in augmented form FIG. 2a sprouts wings and talons and can flap its wings. It can also let out a piercing squawk and project an attack from its beak. The second character in augmented form FIG. 2b sprouts arms holding swords and the third character, which is a chimer of characters 1a and 1 b, shares certain characteristics from its' parent characters but also has its own unique characteristics.

It will be apparent that a physical toy of the invention can be manufactured in any number of ways. One simple embodiment is illustrated in FIG. 3 which shows the three components which give rise to the toy illustrated in FIG. 1a. These components (20, 30, 40) take the form of interconnecting blocks.

The block corresponding to the head of the character has five closed faces which carry images giving the character its' distinctive appearance. It comprises a front face (201) corresponding to the face of the character, a rear face (202), two side faces (203 and 204) and a top face (205). The underside (206) comprises a female mating member (207) which in the embodiment illustrated is a hexagonal recess.

The block corresponding to the torso of the character has four closed faces, namely a front face (301) corresponding to the front of the character, a rear face (302), and two side faces (303 and 304). The top face (305) comprises a male mating member (308) enabling it to be connected or coupled to the underside (206) of block (20). This male mating member, in the embodiment illustrated, is a hexagonal upstand. The underside (306) comprises a female mating member (307), which in the embodiment illustrated is a hexagonal recess.

The block corresponding to the lower body (40) of the character has four closed faces, namely a front face (401), a rear face (402), and two side faces (403 and 404). It has a top face (405) comprising a male mating member (408) enabling it to be connected or coupled to the underside (306) of block (30). It has an underside (406) which comprises a female mating member (407) which in reality has no function.

When assembled correctly, in an authenticated manner, the toy appears as shown in FIG. 1*a*.

Of course it is possibly to produce the toy and its' components in many different ways and the skilled person will of course appreciate this. It is also possible to ensure the three character defining components (which are not intended to be limiting) can only be assembled in a manner giving rise to an authenticated configuration. i.e. they can only be assembled in one way.

Figure 4A:
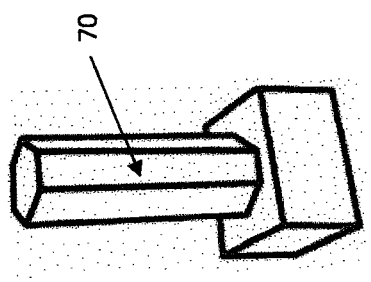
FIGS. 4a and 4b show an alternative construction of a toy of the invention which is adapted to backlight image markers as per a second aspect of the invention.
Figure 4B:
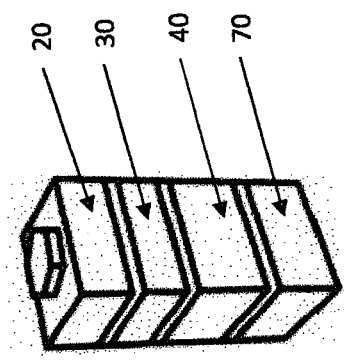

FIGS. 4*a* and 4*b* illustrate an alternative construction of toy (without any artwork) which is particularly suited to creating a toy with a self-illuminating marker system according to a second aspect of the present invention. The toy (10) is made of a translucent or transparent material and the character defining components (20, 30, 40) are assembled over a scaffold (70) which houses a power source and light source (not shown) e.g. a battery and LED array, which can back-light the image marker(s) which are preferably printed or shrunk wrapped onto or around the component blocks which are connected to the scaffold.

Alternatively, or in addition, the image markers may include a luminescent or electro-luminescent coating.

In order to facilitate game play the toys capability is determined by attributes acquired from its components and their combination with the other components. For example, the type of head may give rise to differing powers of intelligence, the type of torso may give rise to differing powers of strength, and the type of lower body may give rise to differing powers of speed, which capabilities may be determined by, for example, the attributes given to the component part (20, 30, 40) per se, by a modified set of attributes additionally based on its juxtaposition with one or more other components, or the composite toy per se. In this regard the toys placement on a given playing surface (90*a*; 90*b*), such as playing cards, which may be independently trackable, through the presence of separate markers (92*a*; 92*b*), can add to the augmented experience enabling an augmented environment to be built around the toy such that the toy does not have to act as the anchor point for gaming.

Because it is possible to achieve thousands of assembly permutations with a relatively small number of multi-component toys, identifying and authenticating the assembled toy quickly, from the augmented reality markers associated with each component was a significant challenge.

Typically, and as illustrated in FIG. 5, augmented reality markers (622, 632, 642) are produced as single images and software responds to the detection of the image marker with some behaviour—typically overlying digital images (722, 732, 742) on top of the camera feed such that they appear on a screen (120) of the viewing device (100), In contrast, and as illustrated in FIG. 6, the system software recognizes a plurality of image markers (22, 32, 42) and if they are in an appropriate juxtaposition with reference to each other generates a single composite marker (234) which in turn gives rise to behaviours—corresponding to the unique character including an augmented digital representation thereof (50*a*; 50*b*. 50*c*) as illustrated in FIGS. 2*a*-2*c*. The digital representation is displayed over the camera feed, such that an enhanced digital representation of the physical toy appears on a screen (120) of the device. The composite marker also has associated with it other game playing information such as any powers attributed to it, which can be used in game play in, for example, a battle between two characters.

In the embodiment described each marker image (22, 32, 42) takes the form of a printed image which makes up all or a part of the toys physical image.

For the toy described the production of a composite marker only occurs if a plurality of augmented reality markers (22, 32, 42), which are present on respective component parts (20, 30, 40), are assembled in an appropriate manner such that the end physical toy is authenticated as a valid toy arrangement. One way of authenticating a correctly assembled toy is illustrated with reference to FIGS. 7 and 8.

Figure 7A:
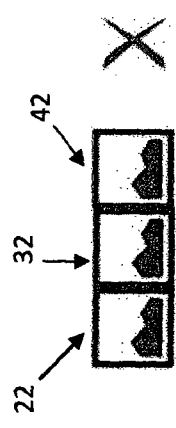
FIGS. 7a to 7c illustrate verification of a composite marker based on physical position.
Figure 7B:
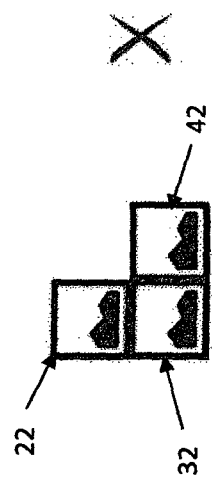
Figure 7C:
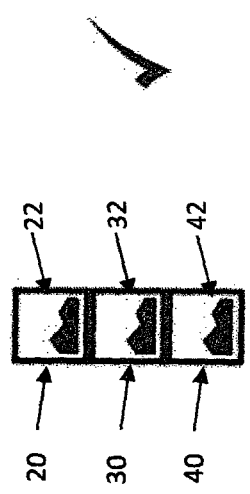
Figure 8A:
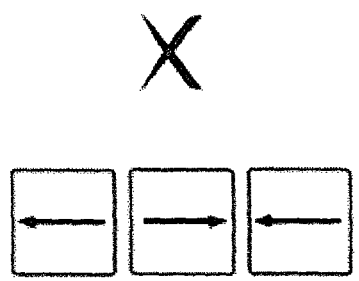
FIGS. 8a to 8b illustrate verification of a composite marker based on relative orientation.
Figure 8B:
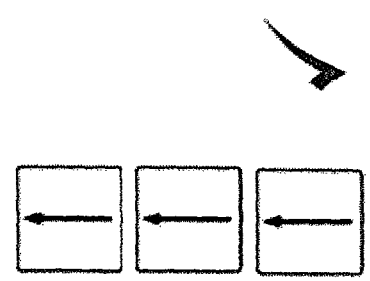

In the embodiment described the three component parts (20, 30, 40) representative of the head, torso and lower body of a character must firstly be assembled together in a correct positional order (FIGS. 7*a* to 7*c*), and secondly the components must be correctly orientated (FIGS. 8*a*-8*b*).

Referring to FIG. 7 the software (510) analyses each marker image (22, 32, 42) and determines whether the physical arrangement of the components (20, 30, 40) is valid (as FIG. 7*c*) or invalid (as FIG. 7*a* or 7*b*).

Since the composite marker (234) is produced through an arrangement of images, rather than a single image, the software (510) responsible for processing the camera feed must perform a continuous evaluation of the feed in order to detect both the presence of marker images (22, 32, 42) and a valid physical arrangement as opposed to an invalid physical arrangement.

In addition to determining an approved physical arrangement, the software also analyses the orientation of the components to ensure that the components are also in a valid orientation (FIG. 8*b*) as opposed to an invalid one (FIG. 8*a*).

Once the software has determined the assembled toy meets the criteria it is authenticated.

The presence of one or more marker components may also be detected in order to allow the software to respond prior to a full, valid detection taking place.

An algorithm compares the relative position and orientation of marker components against a database or list of valid arrangements. For any individual marker component, the algorithm determines the required position and orientation of any other components. The algorithm may employ various degrees of tolerance when analysing position and orientation.

In order for an arrangement to be valid, the algorithm compares the position and orientation of marker components relative to one another.

An example validation rule is one whereby a composite marker is considered valid if all components are oriented around the same axis and are adjacent to one another along a particular axis. Validation rules may vary between implementations.

The software can also be used to assist a user to correctly assemble a toy.

Referring to FIG. 10*a*-*c* a first user (U1) assembles the three components of the toy (20, 30, 40) as shown behind the display (120) of the device (100). When viewed through the device, the camera feed detects the component and the software gives the user a split screen view of the component (40) (FIG. 10*a* left hand side) and a render preview (42) of the component (right hand side).

As the toy is assembled (FIGS. 10*b* and 10*c*) instructions/prompts may be given until a correctly assembled toy is recognised, at which point the toy is registered and the first user (U1) is able to commence game play against another user (U2) or against a toy selected by the system.

During the process the software continuously analyses the device's camera feed and attempts to identify the presence of one or more markers (FIG. 10a). If one or more markers is identified, the software determines whether the marker arrangement signifies the presence of a fully assembled toy (FIG. 10c).

If the software has determined that the user has assembled a toy correctly (FIG. 10c) the toy is registered to the user (U1) and confirmed as an authorised toy.

Figure 11:
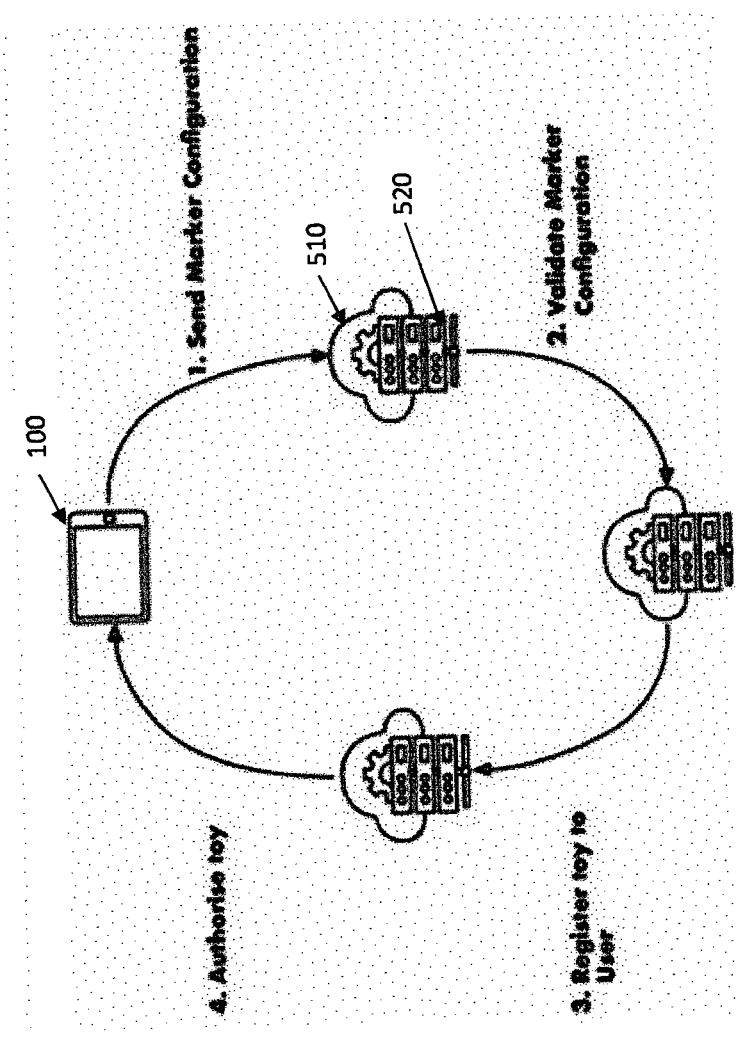

FIG. 11 illustrates the process were the software (510) is run remotely on a server (520). The marker configuration is sent by the device (100) to the server (520). (Step 1). The marker configuration is validated (Step 2). The toy is registered to the user (Step 3) and authorised (step 4).

Figure 12:
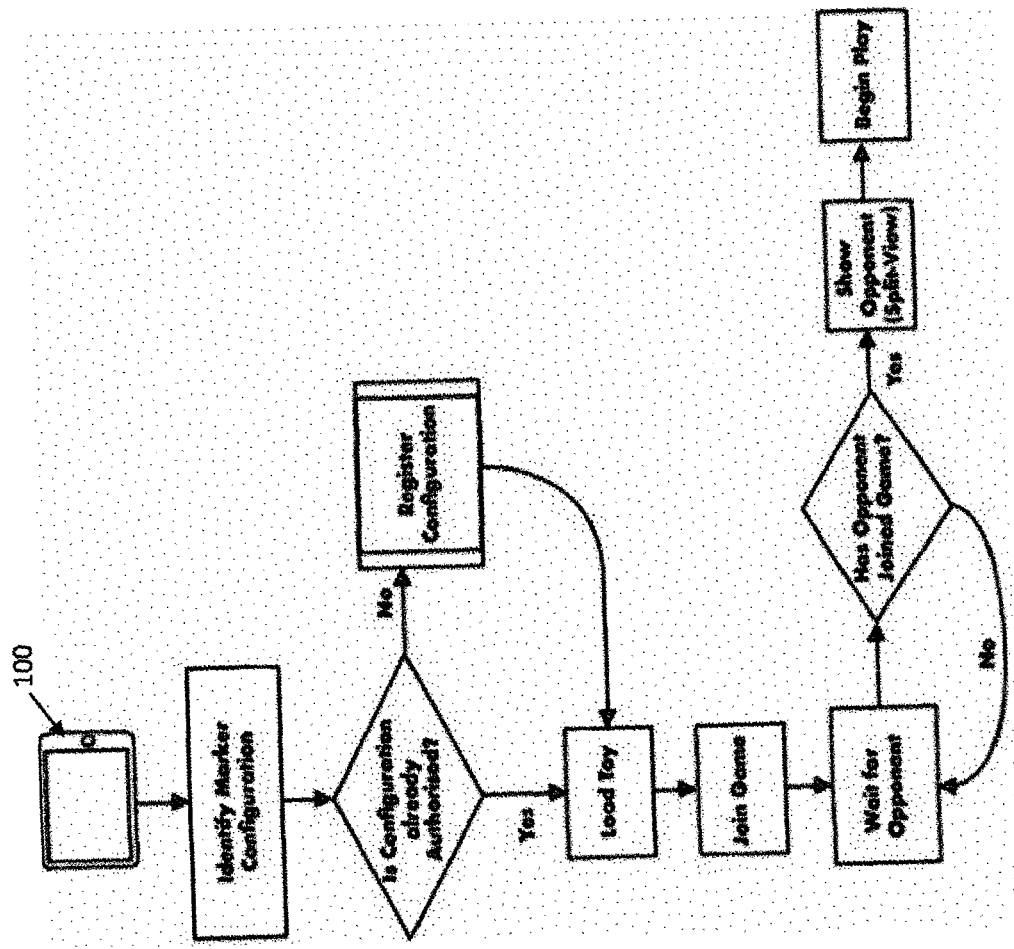

The user is then able to join a game and the process of joining a game is set out, in brief, in FIG. 12.

Referring to FIG. 12 a toy (10) is viewed through a device (100), the marker configuration (22, 32, 42) of the toy is identified, and it is determined whether or not it is authorised. If it is not, the configuration is registered, and if it is already authorised details are uploaded and the user or player is asked to join a game.

The user (U1) selects or invites an opponent to join a game whereupon when the second user (U2) joins the game the first user is able to additionally view the opponents toy on his device (and vice versa). Play can then begin.

Figure 13A:
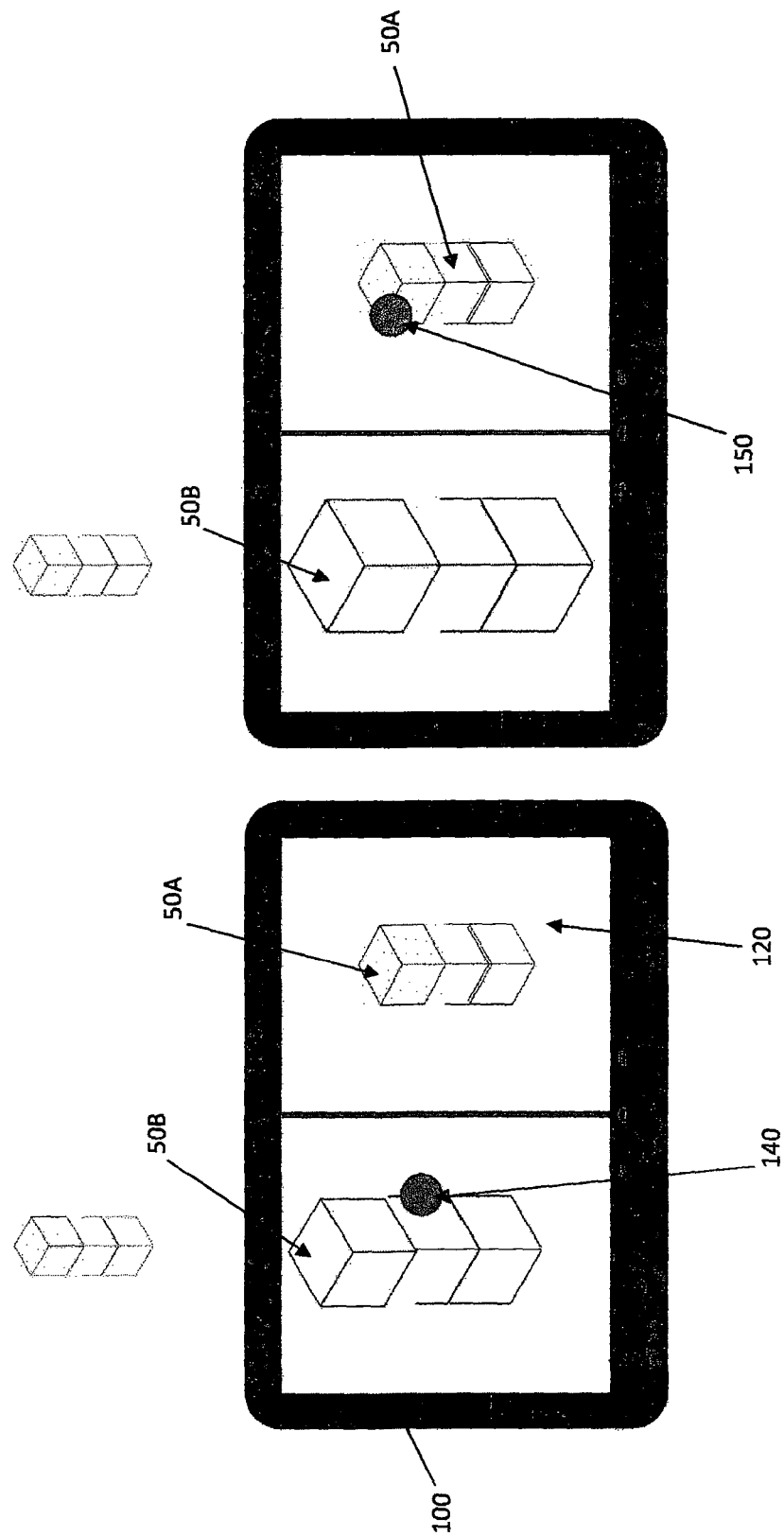
Figure 13B:
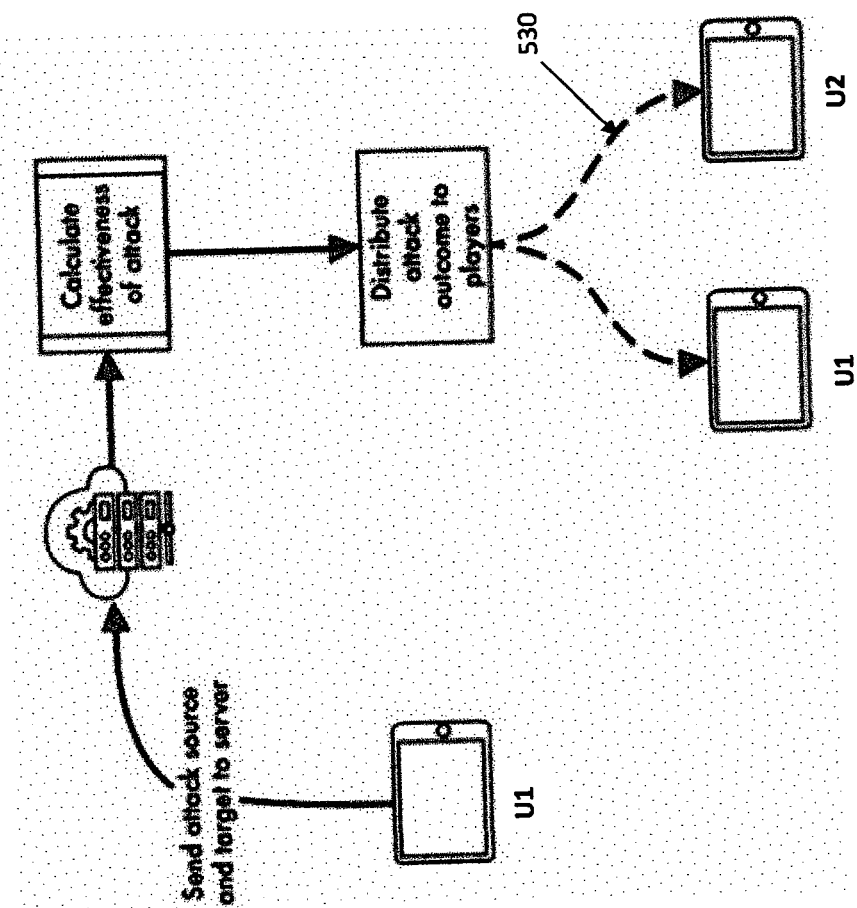
Figure 14:
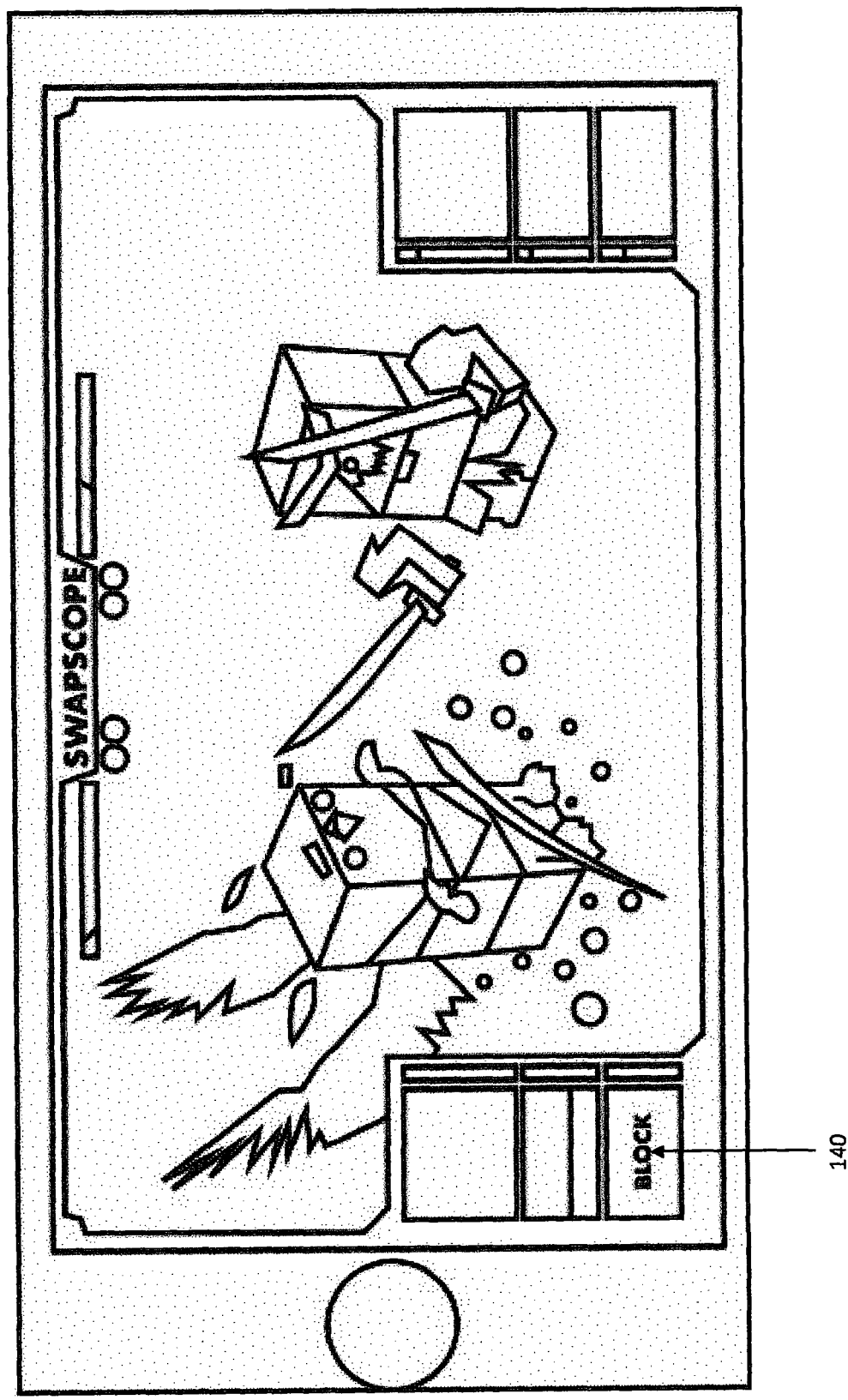

In one game the player's toys do battle and the game is played via a user interface on the device (100) as illustrated in FIGS. 13a to 13c with reference also to FIG. 9 and FIG. 14.

Referring to FIG. 9, game play is facilitated through a device (100) with a camera (110) such as a tablet or phone. The system (500) supporting game play comprises one or more toys (10), one or more viewing devices (100), each with a camera (110), and a display (120) and software (510) which enables digital content (50) to be displayed. The software may be run locally on the device via e.g. an app, or remotely on e.g. a server (520).

One half of a first users screen displays user 1's (U1) (also player 1) augmented character (50b) and one half of the screen displays user 2's (U2) (also player 2 or opponent) augmented character (50a). A touch screen user interface (130) is also provided.

Gameplay is turn-based (FIG. 13a-13c). For each turn a user selects the type of attack they wish to carry out by first tapping on the relevant content (140) (circle in screen 1—FIG. 13a) within the augmented reality view (e.g. user taps on head, torso or lower body) of their toy. They then taps on the relevant content (150) (circle in screen 2—FIG. 13a) within the augmented reality view (e.g. user taps on head, torso or lower body) of their opponents toy. In the representation show User 1 uses characteristics associated with his toys torso to attack the head of his opponent's toy.

Once the user has selected their attack type and target, the software (510) calculates the effectiveness of the attack using an algorithm as illustrated in FIG. 13b. The algorithm takes into account multiple factors which are derived from the attributes of both player's toys. The algorithm determines both the accuracy and the effectiveness of an attack. The algorithm may be executed locally on the device (100) or remotely on a server (520). The algorithm may be executed on both user's devices simultaneously or sequentially, in order to validate the results. Once the effectiveness of an attack has been determined, the software distributes this information to both users (Players 1 and 2) via the network (530).

The software (510) may respond to the output of the algorithm in a variety of ways (FIG. 14c). An attack may result in a hit (indicated in a variety of ways e.g. trajectory of attack visualised (80) and/or text box (82) indicates hit or miss. Further the screen may display (84) the degree of damage inflicted whereby the toys state is altered which in FIG. 9 is indicate on power bars (86).

In the Example given the object is to reduce the opponent's health to zero but other games may have other objectives and the outcomes of turns can be visualised in a variety of ways.

Once both users have received the output of the algorithm, and carried out the appropriate response, the software ends the current player's turn and their opponent is then able to respond. Once a toys health has been depleted, it is considered to have lost the game. After displaying win/loss information to the user, the game may reset or end.

As can be seen in FIG. 9 the display provides details of e.g. the status of the users toy and that of their opponent's toy.

Figure 15:
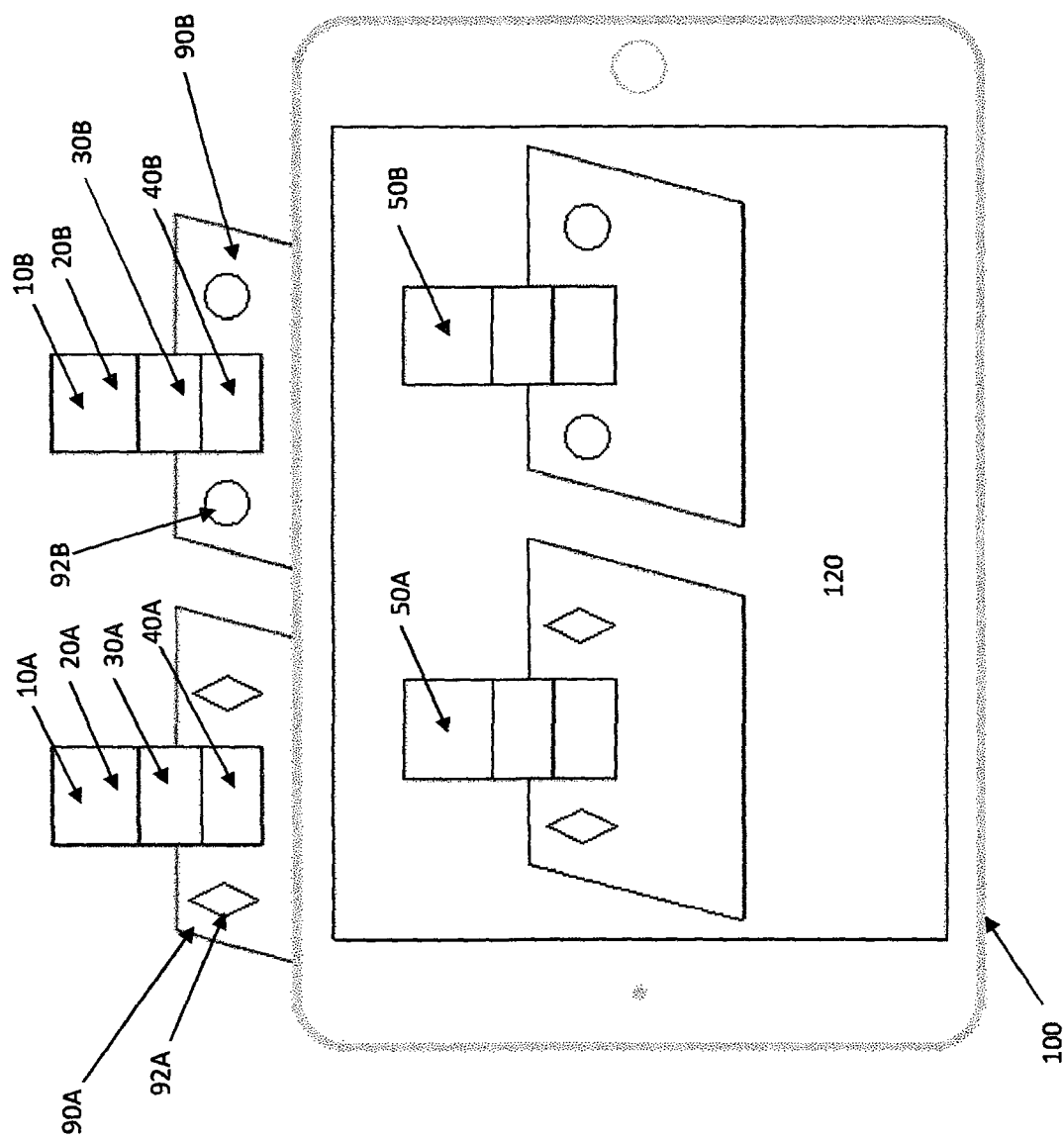
FIG. 15 shows two toys sitting on respective playing surfaces as viewed through a device.

In a preferred variant, as illustrated in FIG. 15, the gaming apparatus comprises a playing surface (90) on which the game is played with the toys (10). The playing surface may be provided in the form of playing cards, each card having its own AR marker (92a; 92b) which can influence game play. Thus, packs of cards may be provided.

The provision of an augmented environment which can be tracked independently of the toy(s) overcomes a number of problems and provides a number of benefits as set out below:

By fixing the augmented digital content to the playing surface and not the toy, the toy can:

1. Move relative to the digital content;
2. Interact with digital elements, for example it can kick a digital ball on the playing surface and cause the ball to move (as the digital content is not anchored to the toy);
3. Play against a second virtual player, as the second player can be anchored to an independent playing surface.

By providing an independently trackable playing surface (90) the system facilitating game play can track the toy in a vertical plane, and the playing environment in the horizontal plane. As a consequence:

1. Environment content can be tracked to the playing surface, by attaching it to the playing card and not the toy.
2. Movement between the toy and the playing surface can be tracked to allow the toy to interact with digital content on the playing surface;
3. By placing multiple toys on multiple playing cards, a single device can track and allow interactions between multiple toys;
4. Due to the addition of added tracking in the horizontal plane, if the toy is placed on a playing card, the device can continuously track the toy's position not just by the toy but also by the playing card; and
5. By using a second playing card, it can be used as the anchor point for a virtual opponent to be visually represented.

The reader will appreciate that the toys and system of the invention can give rise to many different games and the Example provided is merely illustrative.

The invention claimed is:

1. A system comprising a viewing device, a processor operatively connected to the viewing device, and a toy including a plurality of component parts at least two of which include at least one augmented reality marker of a plurality of augmented reality markers, wherein:

the viewing device including a camera;

each of the plurality of augmented reality markers is a physically independent augmented reality image marker;

the processor is configured to detect the plurality of augmented reality markers and determine whether the plurality of augmented reality markers are arranged to define one of a plurality of authenticated composite augmented reality markers, each of which is associated with a toy character and a unique arrangement of the plurality of component parts;

when the plurality of augmented reality markers are determined to define one of the plurality of authenticated composite augmented reality markers, the processor is configured to unlock digital content associated with the corresponding toy character and influence at least one of an appearance and a function of the toy on the viewing device; and when the plurality of augmented reality markers are determined to define one of the plurality of authenticated composite augmented reality markers, the processor is further configured to register the corresponding toy character to a user and enable the user to invite a second user having a second toy character to join a game in which the user's registered toy character and the second toy character are viewable on the viewing device.

2. The system as claimed in claim 1, wherein at least one component part of the at least two component parts with at least one augmented reality marker is substitutable with a component part with a different augmented reality marker.

3. The system as claimed in claim 1, wherein at least two of the plurality of component parts include at least one of a male mating member and a female mating member via which the at least two component parts are linkable one of directly and indirectly to one another.

4. The system as claimed in claim 1, wherein at least one of the plurality of augmented reality markers and the toy do not include a near field capture (NFC) device.

5. The system as claimed in claim 1, wherein the toy defines a character with a head, a torso, and a lower body.

6. The system as claimed in claim 1, wherein the toy is configured to receive a plurality of physical ancillary components.

7. The system as claimed in claim 6, wherein the plurality of physical ancillary components is at least one of a weapon, a transport mechanism, and a protective device.

8. The system as claimed in claim 1, wherein the plurality of component parts are a plurality of multi-faceted components.

9. The system as claimed in claim 8, wherein the plurality of multi-faceted components are a plurality of blocks.

10. The system as claimed in claim 8, wherein at least two faces of the plurality of multi-faceted components include a different augmented reality marker of the plurality of augmented reality markers.

11. The system as claimed in claim 1, further comprising a light mechanism configured to light the plurality of augmented reality markers.

12. The system as claimed in claim 1, wherein the toy is hollow and further includes a light arranged inside the toy configured to light the plurality of augmented reality markers from behind as viewed from outside the toy.

13. The system as claimed in claim 1, wherein the toy is packaged with instructions on how to access augmented digital content.

14. The system as claimed in claim 1, further comprising at least one of a software, a processor, a storage, a memory, an operating system, an i/o device, an accelerometer, and a network interface.

15. The system as claimed in claim 1, wherein the processor is further configured to detect at least one of a relative physical position and a relative orientation of each of the plurality of augmented reality markers to determine whether the plurality of augmented reality markers define one of the plurality of the authenticated composite augmented reality markers.

16. The system as claimed in claim 15, wherein the processor is further configured to receive a camera feed from the viewing device and continuously evaluate the camera feed to track the at least one of the relative physical position and the relative orientation of each of the plurality of augmented reality markers.

17. The system as claimed in claim 15, wherein the processor is further configured to, via an algorithm, compare the at least one of the relative physical position and the relative orientation of each of the plurality of augmented reality markers against a database of valid arrangements.

18. The system as claimed in claim 17, wherein the processor is further configured to employ a degree of tolerance when comparing the at least one of the relative physical position and the relative orientation of each of the plurality of augmented reality markers against the database of valid arrangements.

19. The system as claimed in claim 1, wherein the processor is further configured to provide prompts to the user via the viewing device when the processor detects the plurality of augmented reality markers and that the plurality of augmented reality markers are not arranged to define one of the plurality of authenticated composite augmented reality markers.

20. The system as claimed in claim 1, wherein the processor is structured as a component of one of the viewing device and a remote server.

* * * * *